(12) United States Patent
Spangler et al.

(10) Patent No.: US 12,000,305 B2
(45) Date of Patent: Jun. 4, 2024

(54) AIRFOIL WITH RIBS DEFINING SHAPED COOLING CHANNEL

(71) Applicant: United Technologies Corporation, Farmington, CT (US)

(72) Inventors: Brandon W. Spangler, Vernon, CT (US); David R. Pack, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 470 days.

(21) Appl. No.: 16/682,453

(22) Filed: Nov. 13, 2019

(65) Prior Publication Data

US 2021/0140323 A1     May 13, 2021

(51) Int. Cl.
*F01D 5/18*       (2006.01)

(52) U.S. Cl.
CPC .......... *F01D 5/189* (2013.01); *F05D 2220/32* (2013.01); *F05D 2250/75* (2013.01); *F05D 2260/201* (2013.01); *F05D 2260/22141* (2013.01)

(58) Field of Classification Search
CPC .......... F01D 5/189; F01D 5/188; F01D 5/187
See application file for complete search history.

(56) References Cited

U.S. PATENT DOCUMENTS

| | | | | |
|---|---|---|---|---|
| 2,873,944 | A | * | 2/1959 | Wiese ..................... F01D 5/189 416/92 |
| 5,203,873 | A | * | 4/1993 | Corsmeier ............. F01D 5/147 416/96 A |
| 5,624,231 | A | * | 4/1997 | Ohtomo ................. F01D 5/186 415/115 |

(Continued)

FOREIGN PATENT DOCUMENTS

| | | |
|---|---|---|
| EP | 3783198 | 2/2021 |
| WO | 2015171145 | 11/2015 |

(Continued)

OTHER PUBLICATIONS

Partial European Search Report for European Application No. 20207281.5 completed Jan. 25, 2021.

(Continued)

*Primary Examiner* — Justin D Seabe
*Assistant Examiner* — Behnoush Haghighian
(74) *Attorney, Agent, or Firm* — Carlson, Gaskey & Olds, P.C.

(57) ABSTRACT

An airfoil includes an airfoil wall that defines a leading end, a trailing end, a pressure side, a suction side, and a mean line. First and second ribs each connect the pressure side and the suction side. Each of the first and second ribs define a tube portion that circumscribes a rib passage, and first and second connector arms that solely join the tube portion to, respectively, the pressure side and the suction side. The first rib, the second rib, and the airfoil wall bound a continuous cooling channel there between. The continuous cooling channel has a pressure side portion to the pressure side of the mean line and a suction side portion to the suction side of the mean line. The pressure side portion and the suction side portion each have a cross-sectioned shape selected from an L-shape, a T-shape, and an l-shape.

5 Claims, 4 Drawing Sheets

(56) References Cited

U.S. PATENT DOCUMENTS

| | | | | |
|---|---|---|---|---|
| 7,556,476 B1* | 7/2009 | Liang | ................... | F01D 5/188 |
| | | | | 415/115 |
| 9,011,077 B2* | 4/2015 | Vitt | ................... | F01D 5/186 |
| | | | | 415/115 |
| 9,017,025 B2* | 4/2015 | Lee | ................... | F01D 5/187 |
| | | | | 416/97 R |
| 9,528,381 B2* | 12/2016 | Wassynger | ................. | F01D 5/188 |
| 9,551,228 B2* | 1/2017 | Propheter-Hinckley | ................... | |
| | | | | F01D 5/187 |
| 10,024,171 B2* | 7/2018 | Itzel | ................... | F01D 9/065 |
| 10,156,143 B2 | 12/2018 | Fisk | | |
| 10,174,620 B2* | 1/2019 | Krumanaker | ............ | F01D 9/041 |
| 10,428,686 B2* | 10/2019 | Marsh | ................... | F01D 25/12 |
| 10,494,931 B2* | 12/2019 | Landrum | ................... | F02C 7/18 |
| 10,533,427 B2* | 1/2020 | Marsh | ................... | F01D 5/189 |
| 10,662,778 B2* | 5/2020 | Marsh | ................... | F01D 5/18 |
| 10,711,619 B2* | 7/2020 | Marsh | ................... | F01D 5/186 |
| 10,837,293 B2* | 11/2020 | Craig, III | ................. | F01D 5/188 |
| 10,895,158 B2* | 1/2021 | Sanders | ................. | F01D 5/189 |
| 2007/0128034 A1* | 6/2007 | Lee | ................... | F01D 5/187 |
| | | | | 416/97 R |
| 2012/0269647 A1* | 10/2012 | Vitt | ................... | F01D 5/186 |
| | | | | 416/97 R |
| 2012/0269648 A1* | 10/2012 | Lee | ................... | F01D 5/187 |
| | | | | 416/97 R |
| 2017/0101893 A1* | 4/2017 | Marsh | ................... | F01D 5/18 |
| 2017/0167269 A1* | 6/2017 | Itzel | ................... | F01D 9/065 |
| 2018/0223671 A1* | 8/2018 | Marsh | ................... | F01D 5/18 |
| 2019/0024515 A1* | 1/2019 | Marsh | ................... | F01D 5/189 |
| 2019/0093487 A1* | 3/2019 | Marsh | ................... | F01D 5/189 |

FOREIGN PATENT DOCUMENTS

| | | |
|---|---|---|
| WO | 2015195086 | 12/2015 |
| WO | 2017039572 | 3/2017 |

OTHER PUBLICATIONS

European Search Report for European Application No. 20207281.5 completed May 14, 2021.

Partial European Search Report for European Patent Application No. 23196960.1 mailed Dec. 20, 2023.

* cited by examiner

AIRFOIL WITH RIBS DEFINING SHAPED COOLING CHANNEL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, a pressure side, a suction side, and a mean line from the leading end to the trailing end that is equidistant from the pressure side and the suction side. First and second ribs each connect the pressure side and the suction side. Each of the first and second ribs define a tube portion that circumscribes a rib passage, and first and second connector arms that solely join the tube portion to, respectively, the pressure side and the suction side. The first rib, the second rib, and the airfoil wall bound a continuous cooling channel there between. The continuous cooling channel has a pressure side portion to the pressure side of the mean line and a suction side portion to the suction side of the mean line. The pressure side portion and the suction side portion each has a cross-sectioned shape selected from an L-shape, a T-shape, and an l-shape.

In a further embodiment of any of the foregoing embodiments, the pressure side portion is the L-shape and the suction side portion is the L-shape.

In a further embodiment of any of the foregoing embodiments, the pressure side portion is the T-shape and the suction side portion is the L-shape.

In a further embodiment of any of the foregoing embodiments, the pressure side portion is the L-shape and the suction side portion is the T-shape.

In a further embodiment of any of the foregoing embodiments, the pressure side portion is the l-shape and the suction side portion is the L-shape.

In a further embodiment of any of the foregoing embodiments, the pressure side portion is the L-shape and the suction side portion is the l-shape.

In a further embodiment of any of the foregoing embodiments, the pressure side portion is the l-shape and the suction side portion is the T-shape.

In a further embodiment of any of the foregoing embodiments, the pressure side portion is the T-shape and the suction side portion is the l-shape.

In a further embodiment of any of the foregoing embodiments, the pressure side portion is selected from the T-shape and the L-shape, and the suction side portion is selected from the T-shape and the L-shape.

In a further embodiment of any of the foregoing embodiments, the pressure side portion is selected from the l-shape and the L-shape, and the suction side portion is selected from the l-shape and the L-shape.

In a further embodiment of any of the foregoing embodiments, the pressure side portion is selected from the T-shape and the l-shape, and the suction side portion is selected from the T-shape and the l-shape.

In a further embodiment of any of the foregoing embodiments, the tube portion of at least one of the first rib and the second rib includes at least one cooling aperture connecting the rib passage to the continuous cooling channel.

In a further embodiment of any of the foregoing embodiments, the pressure side of the airfoil wall includes at least one airfoil wall aperture connecting the continuous cooling channel with an exterior gaspath.

A gas turbine engine according to an example of the present disclosure includes a compressor section, a combustor in fluid communication with the compressor section, and a turbine section in fluid communication with the combustor. The turbine section has an airfoil that includes an airfoil wall that defines a leading end, a trailing end, a pressure side, a suction side, and a mean line from the leading end to the trailing end that is equidistant from the pressure side and the suction side. First and second ribs each connect the pressure side and the suction side. Each of the first and second ribs define a tube portion that circumscribes a rib passage, and first and second connector arms that solely join the tube portion to, respectively, the pressure side and the suction side. The first rib, the second rib, and the airfoil wall bound a continuous cooling channel there between. The continuous cooling channel has a pressure side portion to the pressure side of the mean line and a suction side portion to the suction side of the mean line. The pressure side portion and the suction side portion each have a cross-sectioned shape selected from an L-shape, a T-shape, and an l-shape.

In a further embodiment of any of the foregoing embodiments, the pressure side portion is the L-shape and the suction side portion is the L-shape.

In a further embodiment of any of the foregoing embodiments, the pressure side portion is selected from the T-shape and the L-shape, and the suction side portion is selected from the T-shape and the L-shape.

In a further embodiment of any of the foregoing embodiments, the pressure side portion is selected from the l-shape and the L-shape, and the suction side portion is selected from the l-shape and the L-shape.

In a further embodiment of any of the foregoing embodiments, the pressure side portion is selected from the T-shape and the l-shape, and the suction side portion is selected from the T-shape and the l-shape.

An airfoil according to an example of the present disclosure includes an airfoil wall that defines a leading end, a trailing end, a pressure side, a suction side, and a mean line from the leading end to the trailing end that is equidistant from the pressure side and the suction side. First and second ribs each connect the pressure side and the suction side. Each of the first and second ribs define a tube portion that circumscribes a rib passage, and first and second connector arms that solely join the tube portion to, respectively, the pressure side and the suction side. The first rib, the second rib, and the airfoil wall bound a continuous cooling channel there between. At least one of the first connector arm or the second connector arm is an extension of a side wall of the tube portion.

In a further embodiment of any of the foregoing embodiments, the first connector arm is an extension of the side wall of the tube portion, and the second connector arm is an extension of either the side wall of the tube portion or a different side wall of the tube portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
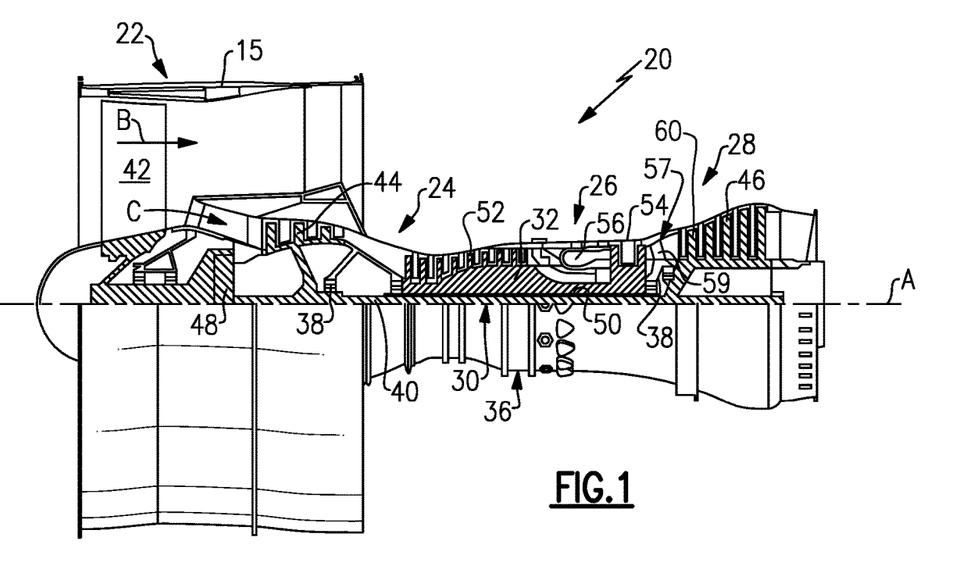
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]^0.5. The "Low corrected fan tip speed" as disclosed herein according to one non-limiting embodiment is less than about 1150 ft/second (350.5 meters/second).

Figure 2:
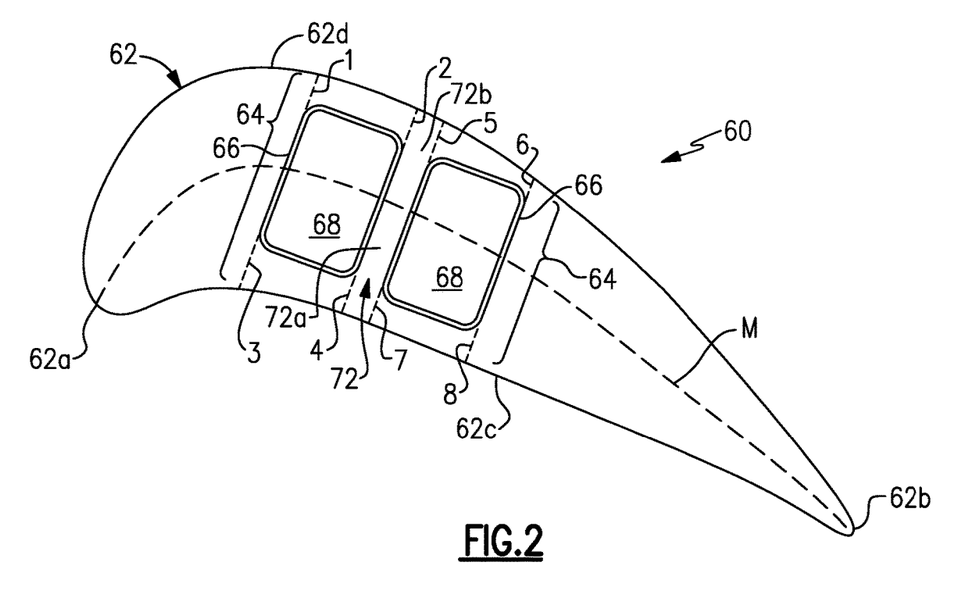
FIG. 2 illustrates an airfoil of the gas turbine engine, with ribs and connector arm locations.

FIG. 2 shows a representation of a sectioned airfoil 60 used in the turbine engine 20 (see also FIG. 1). The airfoil 60 is a turbine blade; however, it is to be understood that this disclosure is also applicable to cooled blades or vanes.

The airfoil 60 includes an (outer) airfoil wall 62 that spans in a radial direction and delimits the aerodynamic profile of the airfoil 60. In this regard, the wall 62 defines a leading end 62a, a trailing end 62b, and pressure and suction sides 62c/62d that join the leading end 62a and the trailing end 62b. A mean line (M) extends from the leading end 62a to the trailing end 62b. All locations on the mean line (M) are equidistant from the sides 62c/62d (in a perpendicular direction to the mean line at the location). For purposes of this disclosure, elements, regions, or portions thereof that are below the mean line (M) in FIG. 2 are considered to be on the pressure side, and elements, regions, or portions thereof that are above the mean line (M) in FIG. 2 are considered to be on the suction side (e.g. a suction side connector arm or a suction side wall).

The airfoil 60 further includes a plurality of ribs 64. Two ribs are shown, although the airfoil 60 in further examples includes one or more additional ribs 64. The rib 64 located toward the leading end 62a in FIG. 2 is a first rib, and the rib 64 located toward the trailing end 62b in FIG. 2 is a second rib. The terminology "first" and "second" is to differentiate that there are two architecturally distinct ribs. It is to be understood that the terms "first" and "second" are interchangeable and that the first rib could alternatively be termed as the second rib and that the second rib could alternatively be termed as the first rib, provided the ribs are adjacent one another. If the airfoil 60 includes additional ribs 64, any two adjacent ribs are considered first and second ribs.

Each rib 64 connects the first and second sides 62c/62d of the airfoil wall 62. Each rib 64 is generally longitudinally elongated between an inner diameter and outer diameter such that it spans the full or substantially full longitudinal distance of the airfoil wall 62. The term substantially full refers to at least 70% of the longitudinal distance between the inner diameter and outer diameter.

Figure 7A:
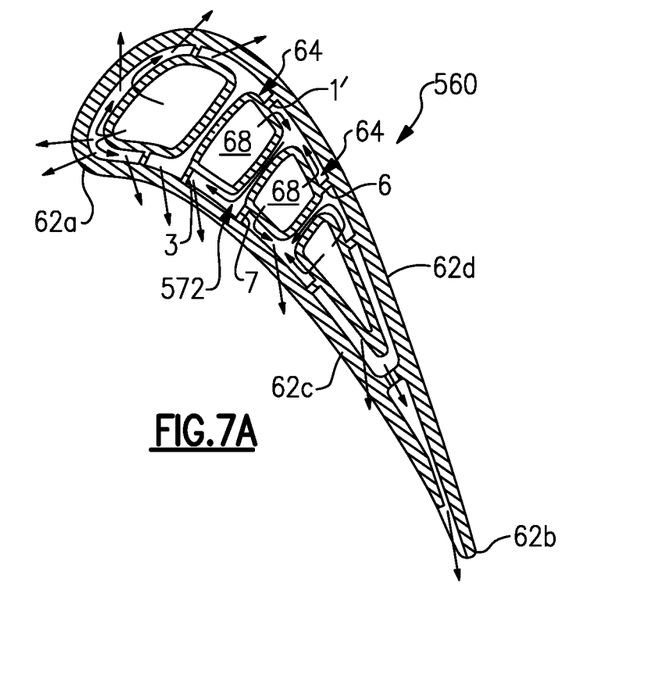
FIG. 7A illustrates an airfoil with a J-configuration of a cooling channel.

Each rib 64 defines a tube portion 66 that circumscribes a rib passage 68. The tube portions 66 are generally of simple convex quadrilateral shape but most typically will be rectangular. Connector arms join the tube portions 66 to the pressure and suction sides 62c/62d of the airfoil wall 62. FIG. 2 illustrates the aforementioned connector arms in phantom, which are numbered 1 through 8, to demonstrate extreme locations where an actual connector arm may be located (subject to being solely joined as discussed below). The connector arm may also be located anywhere between the adjacent numbers. For instance, the suction side connector arm of the first rib 64 may be located partway between location 1 and location 2, as shown in FIG. 7A.

Each tube portion 66 is solely joined to the pressure side 62c by a single connector arm (3 or 4 and 7 or 8) and solely joined to the suction side 62d by a single connector arm (1 or 2 and 5 or 6). Thus, in any one configuration there will be a connector arm at 1 or 2 and 3 or 4 and at 5 or 6 and 7 or 8. As used herein, the phrase "solely join" or variations thereof refers to a single pressure side connector arm being the exclusive structural attachment of the tube portion 66 to the pressure side 62c and a single connector arm being the exclusive structural attachment of the tube portion 66 to the suction side 62d.

Exclusive of any cooling apertures, each connector arm is a solid, continuous wall. Except for connection through the connector arms to the airfoil wall 62, the ribs 64 are disjoined from each other. As used herein, the term "disjoined" refers to the ribs 64 excluding any structural attachments to each other. Such an attachment configuration permits each rib 64 to reinforce the sides 62c/62d and facilitate reduction in bulging from internal pressure, while still permitting the ribs 64 to move and thermally expand and contract at a different rate than the sides 62c/62d during thermal cycling and without interference from adjacent ribs 64.

There is a continuous cooling channel 72 that is bounded by the ribs 64 (between ribs 64), the sides 62c/62d, and the connector arms (1 or 2 and 3 or 4; 5 or 6 and 7 or 8). The cooling channel 72 is continuous in that it spans the adjacent ribs 64 and sides 62c/62d without any partitions.

The locations of the connector arms 1-8 determine the configuration of the cooling channel 72. As will also be discussed below, different configurations are selected to obtain different attributes with regard to stress levels, cooling schemes, and/or manufacturability.

The cooling channel 72 conceptually has two portions, including a pressure side portion 72a to the pressure side of the mean line (M) and a suction side portion 72b to the suction side of the mean line (M). The pressure side portion 72a is bound by the pressure side 62c, mean line (M), the pressure side portions of the tubes 66, and the pressure side connector arms (3 or 4 and 7 or 8). The suction side portion 72b is bound by the suction side 62d, mean line (M), the suction side portions of the tubes 66, and the suction side connector arms (1 or 2 and 5 or 6).

Depending on the selected configurations of the connector arms 1-8, the pressure side portion 72a and the suction side portion 72b of the cooling channel 72 can have a cross-sectioned shape of an L-shape, a T-shape, or an l-shape. The cross-sectioned shape is a section taken along a plane that is perpendicular to the radial direction (relative to engine central longitudinal axis A). For example, with connector arms at 4 and 8 or at 7 and 3, the pressure side portion 72a has the L-shape. With connector arms at 3 and 8, the pressure side portion 72a has the T-shape. With connector arms at 4 and 7, the pressure side portion 72a has the l-shape. Likewise, for connector arms at 1 and 5 or 2 and 6 the suction side portion 72b has the L-shape; for connector arms at 1 and 6 the suction side portion 72b has the T-shape; and for connector arms at 2 and 5, the suction side portion 72b has the l-shape.

The L-shape, T-shape, and l-shape are descriptive of the relative locations of the definitive sections, or "legs," of the portions 72a/72b and does not imply orientations as to forward/backward or up/down in the linguistic sense. For instance, in an L-shape, the ends of the legs meet to form a corner. In a T-shape, the end of one leg meets the other leg at a location intermediate the ends of the leg. And an l-shape has a single leg that does not meet or intersect another leg. Such intersections or meetings are determined by midlines of the legs.

Combinations of the L-shape, T-shape, and l-shape for the pressure side portion 72a and suction side portion 72b generally produce one of five cross-sectional shape configurations for the cooling channel 72 as a whole. For instance, the combination of the L-shape and the T-shape yields a J-configuration. The combination of the L-shape and the l-shape yields an L-configuration. The combination of the T-shape and the l-shape yields a T-configuration. The combination of two L-shapes yields either a C-configuration or a Z-configuration, depending on which way the two L-shapes face. Again, the designation of C-, Z-, L-, T-, or J- do not imply orientations as to forward/backward or up/down in the linguistic sense.

FIGS. 3A through 7A demonstrate respective examples of these five configurations. Although these figures may focus on two ribs 64, the airfoils in these examples all have additional ribs, which may or may not be ribs 64. In general, the rib immediately adjacent the leading end 62a in each of these examples is a rib 64, and the rib immediately adjacent the trailing end 62b is a rib 64 but has a tube portion that tapers. Accordingly, it is to be appreciated that each set of two adjacent ribs 64 has a continuous cooling channel 72 as described herein. Alternatively, the additional ribs may not have the configuration of rib 64.

In this disclosure, like reference numerals are used to designate like elements and reference numerals with the addition of one-hundred or multiples thereof designate modified elements that are understood to incorporate the same features and benefits of the corresponding elements.

Figures 3A, 4A:
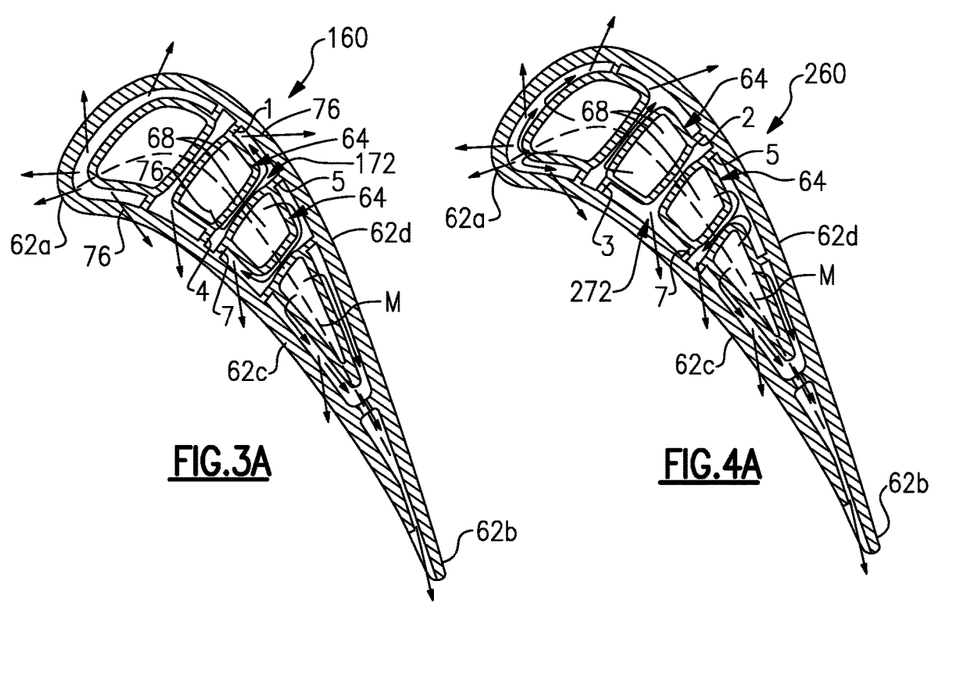
FIG. 3A illustrates an airfoil with an L-configuration of a cooling channel.
FIG. 4A illustrates an airfoil with a T-configuration of a cooling channel.

The ribs 64 of the airfoil 160 in FIG. 3A have connector arms at 1, 4, 5, and 7 such that the cooling channel 172 has the L-configuration. In the orientation depicted in this example, the L-configuration is "suction-forward" homolog in which the lower leg of the "L" runs along the suction side 62d and extends forward from the other leg. The other homologs are "suction-aft" (lower leg runs along the suction side 62d and extends aft from the other leg), "pressure-forward" (lower leg runs along the pressure side 62c and extends forward from the other leg), and "pressure-aft" (lower leg runs along the pressure side 62c and extends aft from the other leg). The L-configuration encompasses all homologs, although each one may yield different stress levels and/or cooling schemes. Notice, also, that the configuration of the connector arms for the other ribs produce channels with C-configurations. Thus, there may be more than one configuration of cooling channels in an airfoil.

The ribs 64 of the airfoil 260 in FIG. 4A have connector arms at 2, 3, 5, and 7 such that the cooling channel 272 has the T-configuration. In the orientation depicted in this example, the T-configuration is a "suction side" homolog in which the top leg of the "T" runs along the suction side 62d. The other homolog is a "pressure side" homolog" (the top leg of the "T" runs along the pressure side 62c). The T-configuration encompasses both homologs, although each one may yield different stress levels and/or cooling schemes.

Figures 5A, 6A:
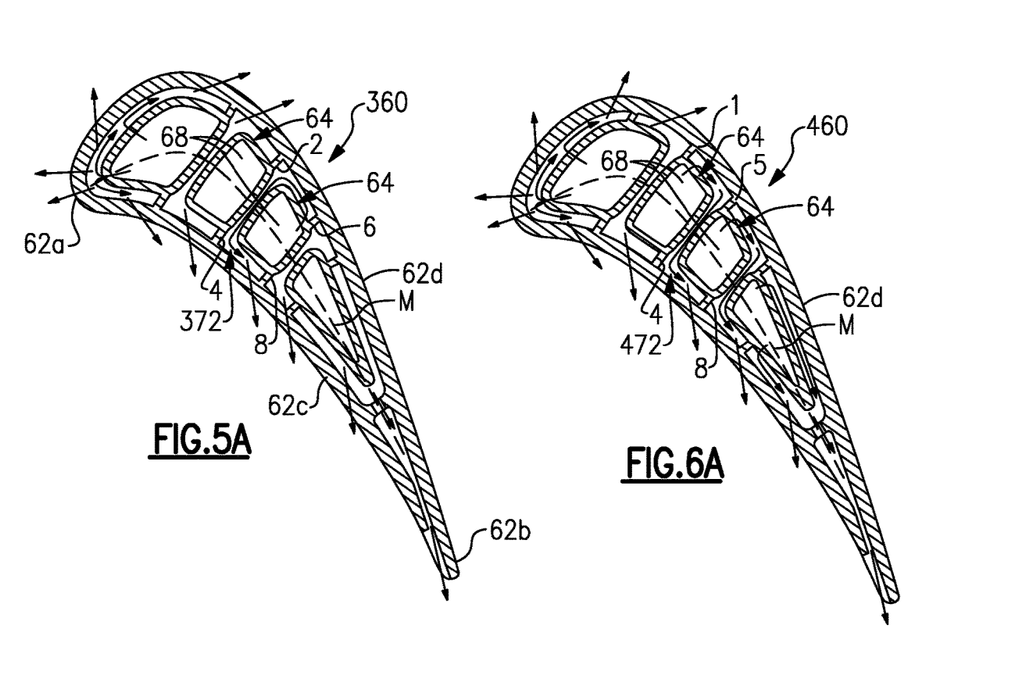
FIG. 5A illustrates an airfoil with a C-configuration of a cooling channel.
FIG. 6A illustrates an airfoil with a Z-configuration of a cooling channel.

The ribs 64 of the airfoil 360 in FIG. 5A have connector arms at 2, 4, 6, and 8 such that the cooling channel 372 has the C-configuration. In the orientation depicted in this example, the C-configuration is an "aft-extending" homolog in which the top and bottom legs of the "C" run along the respective pressure and suction sides 62c/62d and both extend in an aft direction from the middle leg. The other homolog is a "forward-extending" homolog (the top and bottom legs of the "C" run along the respective pressure and suction sides 62c/62d and both extend in a forward direction from the middle leg). The C-configuration encompasses both homologs, although each one may yield different stress levels and/or cooling schemes.

The ribs 64 of the airfoil 460 in FIG. 6A have connector arms at 1, 4, 5, and 8 such that the cooling channel 472 has the Z-configuration. In the orientation depicted in this example, the Z-configuration is an "S-F/P-A" homolog in which the leg that runs along the suction side 62d extends in the forward direction (S-F) from the middle leg and the leg that extends along the pressure side 62c extends in the aft direction (P-A). The other homolog is an "S-A/P-F" homolog (the leg that runs along the suction side 62d extends in the aft direction (S-A) from the middle leg and the leg that extends along the pressure side 62c extends in the forward direction (P-F)). The Z-configuration encompasses both homologs, although each one may yield different stress levels and/or cooling schemes.

The ribs 64 of the airfoil 560 in FIG. 7A have connector arms at 1', 3, 6, and 7 such that the cooling channel 472 has the J-configuration. Notably, the connector arm 1' is spaced from the location of the connector arm 1 in prior examples. Here, the connector arm 1' is spaced aft of the forward wall of the tube portion 66 but is not more than half-way along the length of the suction side wall of the tube portion 66. This is to demonstrate that in additional examples, the location of one or more of the connector arms 1-8 may be varied from the locations shown in the prior examples, in which the connector arms 1-8 are substantially flush with either the forward or aft walls of the tube portion 66 (e.g., the connector arms 1-8 are extensions of either the forward or aft wall of the tube portion 66). At most, from the flush locations, a varied location is not more than half-way along the respective pressure or suction side wall of the tube portion 66 and in further examples is not more than 25% of the length or not more than 10% of the length.

In the orientation depicted in this example, the J-configuration is a "suction-side/forward" homolog in which the top leg of the "J" runs along the suction side 62d and the bottom leg of the "J" extends in a forward direction from the middle leg. The other homologs are a "pressure-side/forward" homolog (top leg of the "J" runs along the pressure side 62c and the bottom leg of the "J" extends in the forward direction from the middle leg); a "suction side/aft" homolog (top leg of the "J" runs along the suction side 62d and the bottom leg of the "J" extends in the aft direction from the middle leg); and a "pressure side/aft" homolog (top leg of the "J" runs along the pressure side 62c and the bottom leg of the "J" extends in the aft direction from the middle leg). The J-configuration encompasses all homologs, although each one may yield different stress levels and/or cooling schemes.

The C-, Z-, T-, L-, and J-configurations enable different cooling schemes, such as but not limited to, impingement cooling schemes, axial flow cooling schemes, radial flow cooling schemes, or combinations of these. Cooling air, such as bleed air from the compressor section 24, is provided thorough the rib passages 68 and the cooling channel or channels 72/172/272/372/472/572. For instance, the cooling air can be fed from a radially inner or radially outer location into the rib passages 68 and the cooling channel or channels 72/172/272/372/472/572.

Flow of cooling air is shown with flow arrows in each of FIGS. 3A through 7A and is indicative of one or more cooling flow circuits. A depiction of a flow arrow that extends through a wall indicates that there is a cooling hole or aperture at that location, several of which are identified at 76 in FIG. 3A. The cooling holes 76 on the wall 62 may be film cooling holes. Cooling holes 76 on the pressure or suction side walls of the tube portions 66 may serve as impingement holes to concentrate flow on the inside surface of the adjacent portion of the wall 62. Cooling holes 76 on the forward or aft walls of the tube portions 66 may serve as either feed holes to provide flow into the adjacent cooling channel, or inlet holes that receive flow from the adjacent cooling channel (depending on the configuration of the cooling flow circuit).

In radial flow schemes, the rib passages 68 and the cooling channel or channels 72/172/272/372/472/572 are flow isolated from each other, and all of the cooling air flow in the rib passages 68 and channels 72/172/272/372/472/572 flows radially. The term "flow isolated" indicates that the rib passages 68 and cooling channels 72/172/272/372/472/572 are not fluidly connected to each other within the airfoil 60 such that air cannot flow within the airfoil 60 from one passage or channel to the another passage or channel. In a modified example, the radial flow in the rib passages 68 and/or cooling channels may turn in a platform and flow in the opposite radial direction into another rib passage 68 or cooling channel 72/172/272/372/472/572.

In impingement cooling schemes, examples of which are shown in each of FIGS. 3A through 7A, at least one tube portion 66 includes a cooling hole on either its pressure side wall or suction side wall to concentrate cooling air flow onto the inside surface of the adjacent portion of the wall 62. The cooling air may then flow to another leg of the cooling channel 72/172/272/372/472/572 and/or out a film cooling hole. The rib passages 68 are thermally isolated from the airfoil wall 62 except for the connector arms 1-8. Thus, cooling air delivered through the rib passages 68 gains minimal heat from the airfoil wall 62, thereby permitting the ribs 64 to feed relatively cool air to the airfoil wall 62 and cooling channel 72/172/272/372/472/572.

Figure 3B:
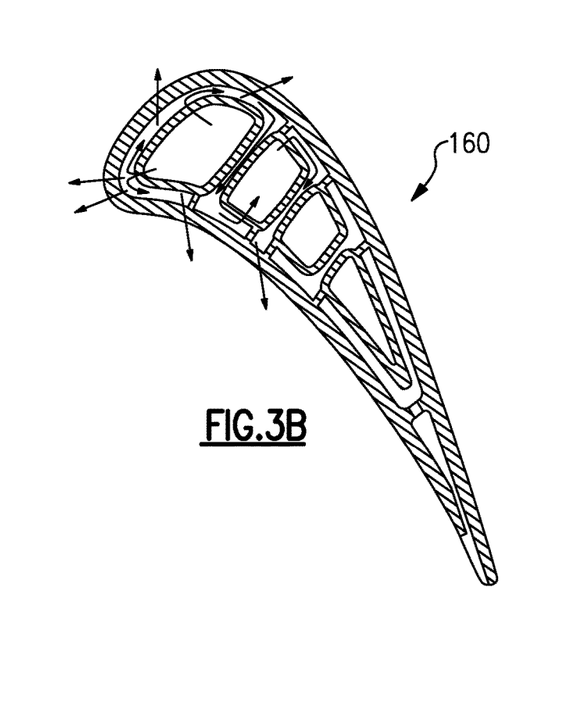
FIG. 3B illustrates the airfoil of FIG. 3A with an axial flow cooling scheme.
Figure 4B:
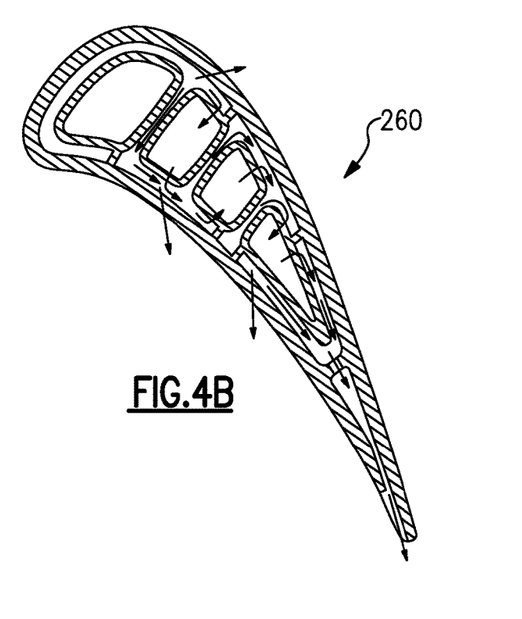
FIG. 4B illustrates the airfoil of FIG. 4A with an axial flow cooling scheme.

FIGS. 3B through 7B show the same airfoils as the airfoils in their numerical counterpart figures (e.g., the airfoil in FIG. 3B is the same as in FIG. 3A, the airfoil in FIG. 4B is the same as in FIG. 4A, and so on and so forth for 5B/5A, 6B/6A, and 7B/7A) except that the airfoils in FIGS. 3B through 7B have axial flow cooling schemes. The airfoils in FIGS. 3B through 7B are not numbered other than the airfoils 160/260/360/460/560, as the structure is as described above for the counterpart "A" figures. In an axial flow scheme, cooling air is provided to the rib passage 68 of one of the ribs 64, i.e., a feed rib. The feed rib feeds cooling air to the adjacent cooling channel 72/172/272/372/472/572. The cooling air may then be ejected from a film cooling hole in the wall 62 and/or fed into the rib passage 68 of the adjacent rib 64, i.e., a dependent rib. In a similar manner the dependent rib may serve as a feed rib for the next adjacent rib 64, i.e., a secondary dependent rib.

Figure 5B:
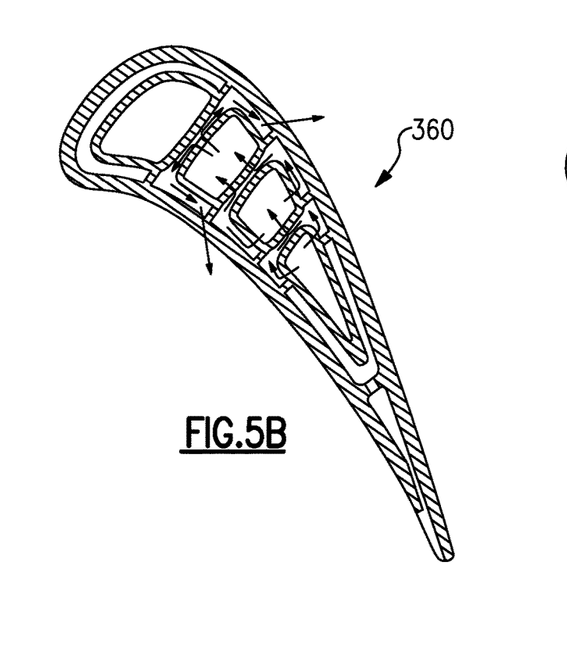
FIG. 5B illustrates the airfoil of FIG. 5A with an axial flow cooling scheme.
Figure 6B:
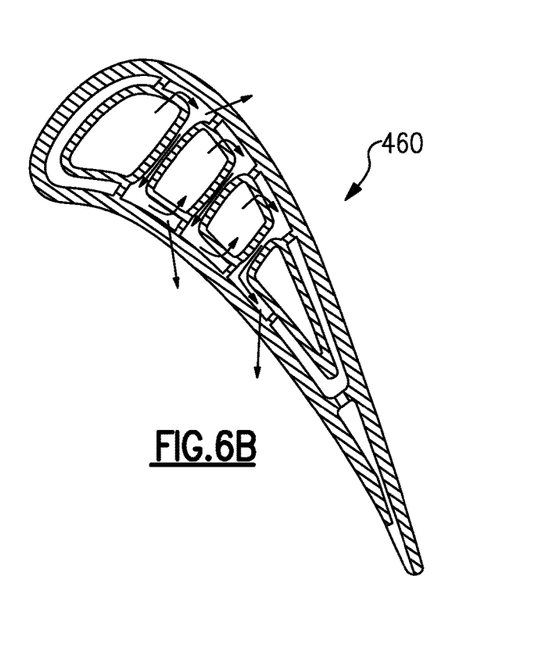
FIG. 6B illustrates the airfoil of FIG. 6A with an axial flow cooling scheme.
Figure 7B:
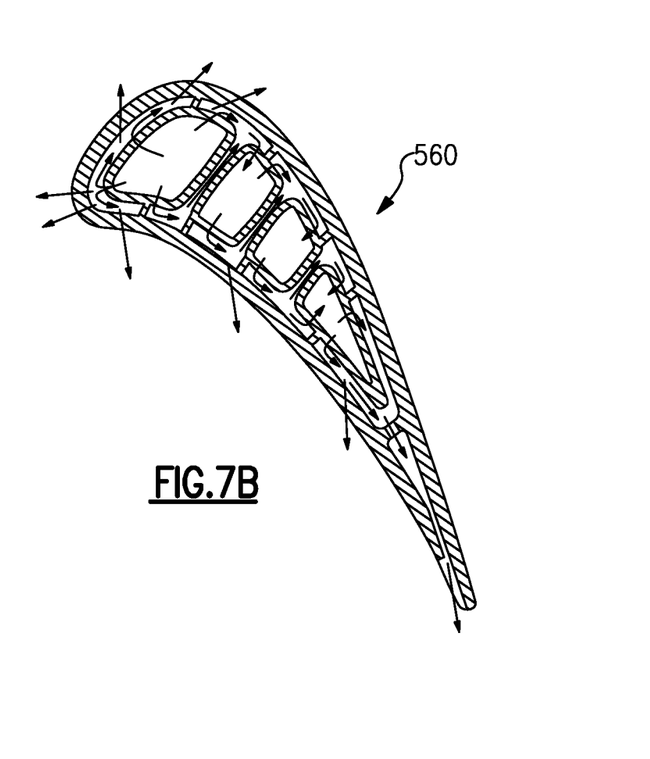
FIG. 7B illustrates the airfoil of FIG. 7A with an axial flow cooling scheme.

The axial cooling schemes will not be discussed in detail, but in general the scheme in FIG. 3B is an aft-flow scheme in which the leading end rib is a feed rib and the next adjacent aft rib is a dependent rib. The scheme in FIG. 4B is an aft-flow scheme in which the leading end rib is a feed rib, the next adjacent aft rib is a dependent rib, the next adjacent aft rib is a secondary dependent rib, and the trailing end rib is a tertiary dependent rib. The scheme in FIG. 5B is a forward flow scheme in which the trailing end rib is a feed rib, the next adjacent forward rib is a dependent rib, and the next adjacent forward rib is a secondary dependent rib. The scheme in FIG. 6B is an aft flow scheme in which the leading end rib is a feed rib, the next adjacent aft rib is a secondary rib, and the next adjacent aft rib is a secondary dependent rib. The scheme in FIG. 7B is an aft-flow scheme in which the leading end rib is a feed rib, the next adjacent aft rib is a dependent rib, the next adjacent aft rib is a secondary dependent rib, and the trailing end rib is a tertiary dependent rib.

The configurations in accordance with this disclosure facilitate tailoring the performance of the airfoils with regard to such attributes as stress levels (due to thermal gradients), cooling air flow, and manufacturability. For example, without being bound, relative to the group of configurations as a whole, the particular configurations are expected to have the attributes below, with the following general understandings.

Thermal stresses in the ribs 64 are due to thermal gradients. The highest temperatures are at the exterior of the wall 62. The heat can only conduct into the rib 64 via the connector arms. The location on the rib 64 that is farthest away from the connector arms will be the coldest location, because it has the longest thermal conduction path. The difference in temperature between the wall 62 at the connector arm and that farthest location on the rib 64 is the thermal gradient of interest for the ribs 64. Therefore, configurations with relatively "closer" farthest locations have lower thermal stress than configurations with relatively "far" farthest locations.

Thermal growth differences between opposed locations of the pressure side 62c and the suction side 62d also contribute to rib stress. Long extents of the wall 62 between connector arms thermally grow more than short extents of the wall 62 between connector arms. This difference in thermal growth may induce stress across the rib 64. For instance, the pressure side homolog T-configuration shown in FIG. 4A has a short extent on the suction side and a long extent on the pressure side that can result in high stresses due to extent differences between pressure and suction sides. Whereas, the C-configuration shown in FIG. 5A has long extents on both the pressure and suction sides, resulting in very little thermal growth difference and lower stresses.

The configurations also enable flow control. For instance, rib passages 68 and channels 72/172/272/372/472/572 can be either flow isolated or flow connected, which enables flows to the pressure side and suction side to be optimized. Flow may also be used to cool the suction side 62d and the pressure side 62c, facilitating efficient use of the cooling air.

The configurations also have different manufacturability. For instance, airfoils are usually fabricated in an investment casting process. Typically, channels or passages in the airfoil are formed by cores around which the alloy is cast. The cores are later removed, leaving a channel or passage of the same geometry of the core in its place. Cores may be manufactured by several different processes, but injection die molding is preferred. Not all core geometries, however, can be injection die molded. There must be a parting line of the die which enables the die to be opened without destroying the molded core. Accordingly, only some of the core geometries that would be needed to make the configurations according to the present disclosure can be injection molded. To facilitate the use of simple injection molding core dies, each of the airfoils in the present disclosure can be made from several individual cores that are assembled together. Alternatively, the cores may be made all at once by injecting core material around sacrificial inserts representing the ribs in a hollow airfoil shaped core die and later removing the sacrificial inserts. The fabrication of some or all of the airfoils described herein is not limited to investment casting, however, and alternate processes such as additive manufacturing may be used.

C-Configuration

This configuration is relatively low stress level due to similar sizes of areas cooled on the opposed pressure and suction sides. However, the ribs have relatively "far" farthest locations that add thermal stress. This configuration enables flow control by impingement onto suction side and then flow through the C-channel to the pressure side to exit out film holes on the pressure side, which may enable fewer suction side film holes. The cooling air is thus used to cool both the suction side and the pressure side. However, this configuration does not have great manufacturability because of the complex dies required to create the configuration through injection molding.

Z-Configuration

This configuration is relatively low stress level due to similar sizes of areas cooled on the opposed pressure and suction sides. This configuration enables flow control by impingement onto suction side and then flow through the Z-channel to the pressure side to exit out film holes on the pressure side, which may enable fewer suction side film holes. The cooling air is thus used to cool both the suction side and the pressure side. This configuration also has good manufacturability because the required Z-core can be injection molded with simple dies.

T-Configuration

This configuration is relatively high stress due to dissimilar sizes of areas cooled on the opposed pressure and suction sides. However this configuration has good flow control because flow that goes primarily to cool the pressure side (the top leg of the "T" along the pressure side) can be separated from flow that goes primarily to the suction side (the top leg of the "T" along the suction side). This configuration also has good manufacturability because the required T-core can be injection molded with simple dies.

L-Configuration

This configuration is relatively high stress due to dissimilar sizes of areas cooled on the opposed pressure and suction sides. However, this configuration has good flow control because flow that goes primarily to cool the pressure side (the bottom leg of the "L" along the pressure side) can be separated from flow that goes primarily to the suction side (the bottom leg of the "L" along the suction side). It also has good manufacturability because the required L-core can be injection molded with simple dies.

J-Configuration

This configuration is moderate stress level due to somewhat similar sizes of areas cooled on the opposed pressure and suction sides. However, the ribs have relatively "far" farthest locations that add thermal stress. This configuration enables flow control by impingement onto suction side and then flow through the Z-channel to the pressure side to exit out film holes on the pressure side, which may enable fewer suction side film holes. This configuration does not have great manufacturability because of the complex dies required to create the configuration through injection molding.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising: an airfoil wall defining a leading end, a trailing end, a pressure side, a suction side, and a mean line from the leading end to the trailing end that is equidistant from the pressure side and the suction side; and first and second ribs each connecting the pressure side and the suction side, the first rib being forward of the second rib, each of the first and second ribs defining: a tube portion circumscribing a rib passage, the tube portion having fore and aft tube walls, a pressure side tube wall parallel to the pressure side of the airfoil wall, and a suction side tube wall parallel to the suction side of the airfoil wall, the pressure side tube wall and the suction side tube wall meeting the each of the fore and aft tube walls at a forward pressure side corner, a forward suction side corner, an aft pressure side corner, and an aft suction side corner such that the tube portion has a quadrilateral shape in cross-section taken in a plane perpendicular to a radial direction of the airfoil wall, and first and second connector arms located at, respectively, the forward suction side corner and the aft pressure side corner, the first and second connector arms solely joining the tube portion to, respectively, the suction side and the pressure side; the first rib, the second rib, and the airfoil wall bounding a continuous cooling channel there between, the continuous cooling channel having, when taken in the plane perpendicular to the radial direction of the airfoil wall, a first leg elongated in a direction transverse to the mean line and bound by the fore tube wall of the second rib and the aft tube wall of the first rib, a second leg initiating at, and aftly extending from, an end of the first leg and bound by the pressure side of the airfoil wall, the pressure side tube wall of the second rib, and the second connector arm, and a third leg initiating at, and forwardly extending from, an opposed end of the first leg and bound by the suction side of the airfoil wall, the suction side tube wall of the first rib, and the first connector arm, the first leg, the second leg, and the third leg together defining a Z-configuration when taken in the plane perpendicular to the radial direction of the airfoil wall.

2. The airfoil as recited in claim 1, wherein at least the fore and aft tube walls are, relative to the rib passage, convex.

3. The airfoil as recited in claim 1, wherein the first and second ribs include cooling holes configured in an axial cooling flow circuit arranged, in flow order, from the rib passage of the first rib, to the third leg, to the first leg, to the second leg, and to the rib passage of the second rib.

4. The airfoil as recited in claim 3, wherein the suction side tube wall of the first rib includes a cooling hole connecting the rib passage of the first rib with the third leg, and the pressure side tube wall of the second rib includes a cooling hole connecting the rib passage of the second rib with the second leg.

5. The airfoil as recited in claim 1, wherein the first connector arm is located forward of an axial midpoint of the section side tube wall of the first rib, and the second connector arm is located aft of an axial midpoint of the pressure side tube wall of the second rib.

* * * * *